T. R. CORNICK.
Grain-Drill.

No. 41,199.                                    Patented Jan. 12, 1864.

Witnesses:
Geo. W. Reed
M. Livingston

Inventor:
T. R. Cornick

UNITED STATES PATENT OFFICE.

T. R. CORNICK, OF INDEPENDENCE, IOWA.

IMPROVEMENT IN GRAIN-DRILLS.

Specification forming part of Letters Patent No. 41,199, dated January 12, 1864.

*To all whom it may concern:*

Be it known that I, T. R. CORNICK, of Independence, in the county of Buchanan and State of Iowa, have invented a new and Improved Seeding-Machine; and I do hereby declare that the following is a full, clear, and exact description of the same, reference being had to the accompanying drawings, making a part of this specification, in which—

Figure 1:
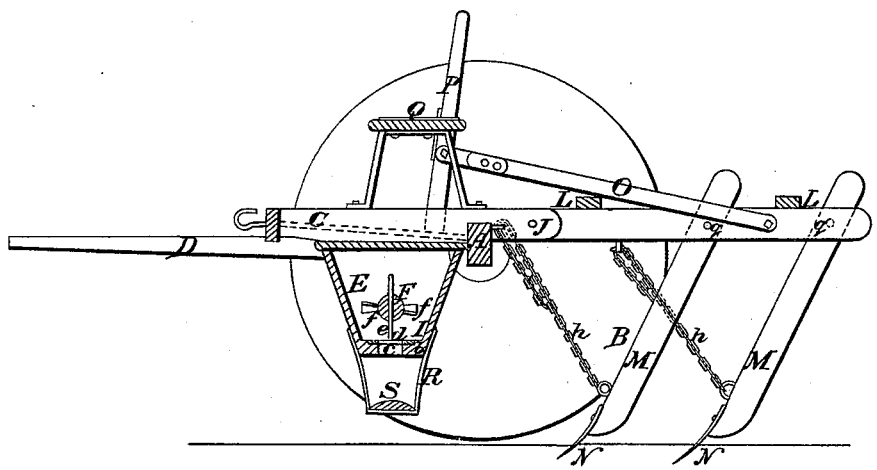
Figure 2:
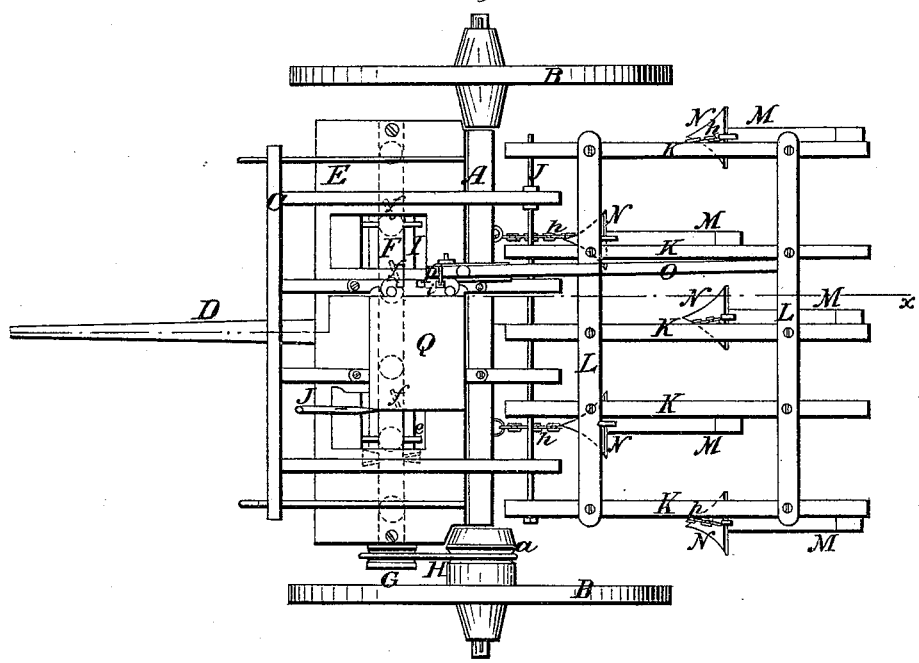

Figure 1 is a side sectional view of my invention, taken in the line $x\ x$, Fig. 2; Fig. 2, a plan or top view of the same.

Similar letters of reference indicate corresponding parts in the two figures.

This invention relates to an improvement in the means employed for distributing the seed, and also in a novel and improved arrangement of the seed-covering device, as hereinafter fully shown and described, whereby it is believed that several advantages are obtained over the ordinary seeding-machines in common use.

To enable those skilled in the art to fully understand and construct my invention, I will proceed to describe it.

A represents an axle, which has a wheel, B, placed on each end of it, and C is a rectangular frame, which is permanently attached to the axle A at its front side, and has a draft-pole, D, secured centrally to it.

E is a seed-box, which is secured to the front side of the axle A, underneath the frame C. This seed-box extends nearly the whole length of the axle, and has a shaft, F, fitted longitudinally in its lower part, said shaft extending through one end of the seed-box, and having a pulley, G, upon it, around which and a hub, $a$, of one of the wheels B a band, K, passes. The bottom $b$ of the seed-box E is perforated with holes $c$, at a suitable distance apart, and upon the bottom $b$ there is placed longitudinally a slide, I, which may be of sheet metal. This slide I is perforated with holes $d$, the diameter of which is equal to the holes $c$ in the bottom $b$, and said slide is adjusted longitudinally by means of a lever, J, so that the relative position of the holes $d$ in the slide and the holes $c$ in the bottom $b$ of the seed-box may be varied, as desired, in order to regulate the capacity of the hole $c$. For instance, when the holes $c\ d$ are in line with each other the full capacity of $c$ is obtained; and when the holes $d$ are thrown more or less out of line with the holes $c$ the capacity of the latter will be varied accordingly.

The shaft F has a number of rods, $e$, passing through it, one directly over each hole in the slide I and bottom $b$. The ends of these rods $e$, as the shaft F rotates, pass quite close to the holes $d$ in the slide I, and effectually prevent the choking or clogging up of said holes and the holes $c$ in the bottom $b$.

To the shaft F, midway between the rods $e$, there are attached spiral wings $f$, which, as the shaft F rotates, throw the seed toward the holes $d$ in the slide I. The form or position of these wings is shown clearly in Fig. 2. They are attached to the shaft F in pairs, those of each pair being at opposite points and in reverse positions, so as to throw the grain in two directions or toward the holes at each side of them.

In the back part of the frame C there is placed a rod, J, on which a series of parallel bars, K, are fitted loosely, said bars being connected and kept in proper position by transverse bars L L, as shown clearly in Fig. 2. To each of the bars K there is attached by a pivot-bolt, $g$, an arm, M, and these arms have shovel-teeth N attached to them. The bars K are connected alternately by chains $h$ to the axle A and bars K. These chains hold the arms M in proper position.

To one of the bars K there is attached a rod or bar O, the front end of which is pivoted to an upright adjustable lever, P. This lever P is pivoted at its lower end to the frame of the machine and occupies an upright position alongside of the driver's seat Q, the said driver's seat having a notched plate, $i$, attached to it, into either notch of which the lever P may be fitted. By thus adjusting this lever P the bars K may be raised or lowered, so that the teeth N may penetrate into the earth the required distance or be elevated above the earth when necessary, as in turning at the ends of rows or in drawing the machine from place to place.

To the lower part of the seed-box E, at each side, there is attached a pendant stirrup, R, on which a scattering-board, S, rests. This scattering-board extends the whole length of the seed-box, and has its upper surface convex in its transverse section, as shown clearly in Fig. 1. The seed, as it is discharged from the seed-box B, falls upon this board, which, owing to its convex upper surface, scatters the seed and causes it to fall in a proper broadcast manner upon the ground.

Having thus described my invention, what I claim as new, and desire to secure by Letters Patent, is—

The arrangement of the suspended scattering-board S with the seed-box E, beams K, stocks M, braces $h$, and shovels N, all as herein shown and described.

T. R. CORNICK.

Witnesses:
GEO. W. REED,
M. M. LIVINGSTON.